United States Patent
Ratasuk et al.

(10) Patent No.: US 12,219,521 B2
(45) Date of Patent: Feb. 4, 2025

(54) ASSOCIATING SENSING INFORMATION WITH A USER

(71) Applicant: NOKIA TECHNOLOGIES OY, Espoo (FI)

(72) Inventors: Rapeepat Ratasuk, Inverness, IL (US); Ryan Keating, Chicago, IL (US); Amitabha Ghosh, Buffalo Grove, IL (US); Jun Tan, Glenview, IL (US); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/099,775

(22) Filed: Jan. 20, 2023

(65) Prior Publication Data

US 2023/0164741 A1 May 25, 2023

Related U.S. Application Data

(62) Division of application No. 17/117,521, filed on Dec. 10, 2020, now Pat. No. 11,627,549.

(51) Int. Cl.
*H04W 64/00* (2009.01)
*H04W 4/02* (2018.01)
(Continued)

(52) U.S. Cl.
CPC ......... *H04W 64/006* (2013.01); *H04W 4/027* (2013.01); *H04W 4/029* (2018.02);
(Continued)

(58) Field of Classification Search
CPC ............... H04W 4/025; H04W 64/003; H04W 56/0045; H04W 8/24; H04W 76/11;
(Continued)

(56) References Cited

U.S. PATENT DOCUMENTS

| 8,000,724 B1 * | 8/2011 | Rayburn ............... H04W 4/029 455/518 |
| 8,787,944 B2 | 7/2014 | Smith |

(Continued)

FOREIGN PATENT DOCUMENTS

| CN | 202957987 U | 5/2013 |
| KR | 20100128573 A | 12/2010 |

(Continued)

OTHER PUBLICATIONS

International Search Report and Written Opinion received for corresponding Patent Cooperation Treaty Application No. PCT/EP2021/076219, dated Apr. 8, 2022, 20 pages. No copy provided, per MPEP 609. Copy submitted in parent U.S. Appl. No. 17/117,521.

(Continued)

*Primary Examiner* — Congvan Tran
(74) *Attorney, Agent, or Firm* — SQUIRE PATTON BOGGS (US) LLP

(57) ABSTRACT

Certain example embodiments provide systems, methods, apparatuses, and computer program products for associating sensing information with a user (e.g., a cellular user) by, for example, determining information from both a sensing node and a communication node, then associating the a sensed object and the communication node based on the information. Additionally, or alternatively, some embodiments provide systems, methods, apparatuses, and computer program products for radar and sensing-based positioning.

10 Claims, 10 Drawing Sheets

(51) Int. Cl.
  *H04W 4/029* (2018.01)
  *H04W 8/12* (2009.01)
  *H04W 8/24* (2009.01)
  *H04W 56/00* (2009.01)
  *H04W 76/11* (2018.01)

(52) U.S. Cl.
  CPC .............. *H04W 8/12* (2013.01); *H04W 8/24* (2013.01); *H04W 56/0045* (2013.01); *H04W 64/003* (2013.01); *H04W 76/11* (2018.02)

(58) Field of Classification Search
  CPC ... H04W 4/027; H04W 4/029; H04W 64/006; H04W 8/12; G01S 13/765
  See application file for complete search history.

(56) References Cited

U.S. PATENT DOCUMENTS

| | | |
|---|---|---|
| 9,121,924 B2 | 9/2015 | Ng et al. |
| 9,210,683 B2 | 12/2015 | Moshfeghi |
| 10,142,793 B2 | 11/2018 | Pandharipande et al. |
| 10,638,391 B2 | 4/2020 | Vikberg et al. |
| 11,089,107 B1* | 8/2021 | Chor ................. H04L 63/08 |
| 11,259,141 B2 | 2/2022 | Li et al. |
| 2007/0224990 A1 | 9/2007 | Edge et al. |
| 2011/0228693 A1* | 9/2011 | Larsson ............... H04W 72/02 370/252 |
| 2012/0287875 A1 | 11/2012 | Kim et al. |
| 2013/0005240 A1* | 1/2013 | Novak .................. H04B 7/26 455/11.1 |
| 2014/0051426 A1 | 2/2014 | Siomina et al. |
| 2014/0141801 A1 | 5/2014 | Kummetz |
| 2014/0192739 A1 | 7/2014 | Liao |
| 2014/0315593 A1 | 10/2014 | Vrzic et al. |
| 2014/0323119 A1 | 10/2014 | Bader |
| 2015/0327328 A1 | 11/2015 | Novak et al. |
| 2016/0100288 A1* | 4/2016 | Chaponniere ......... H04W 4/023 455/456.1 |
| 2016/0241348 A1 | 8/2016 | Zirwas et al. |
| 2017/0124781 A1* | 5/2017 | Douillard ............... G08G 1/207 |
| 2018/0343635 A1 | 11/2018 | Edge et al. |
| 2018/0365909 A1* | 12/2018 | Cheng ..................... H04W 4/40 |
| 2019/0182627 A1* | 6/2019 | Thoresen .............. H04L 63/045 |
| 2019/0182665 A1 | 6/2019 | Edge |
| 2019/0230619 A1 | 7/2019 | Cui et al. |
| 2019/0260455 A1 | 8/2019 | Ryu et al. |
| 2019/0297595 A1 | 9/2019 | Sirotkin et al. |
| 2019/0324109 A1* | 10/2019 | Alnås ..................... G01S 5/0072 |
| 2020/0064437 A1 | 2/2020 | Hughes et al. |
| 2020/0252233 A1* | 8/2020 | O'Keeffe ............. H04L 12/2818 |
| 2020/0264261 A1 | 8/2020 | Akkarakaran et al. |
| 2020/0275402 A1 | 8/2020 | Shi et al. |
| 2020/0296680 A1 | 9/2020 | Akkrakaran et al. |
| 2020/0389257 A1* | 12/2020 | Kung ..................... H04W 4/06 |
| 2021/0078571 A1* | 3/2021 | Zhu ........................ H04W 12/03 |
| 2021/0142059 A1* | 5/2021 | Lee ......................... G06V 10/82 |
| 2021/0286040 A1 | 9/2021 | Morishita et al. |
| 2022/0078605 A1* | 3/2022 | Alnås ..................... H04W 8/24 |
| 2023/0171799 A1* | 6/2023 | Guo ....................... H04W 72/54 370/329 |
| 2023/0370820 A1* | 11/2023 | Cheng ..................... H04W 8/22 |

FOREIGN PATENT DOCUMENTS

| | | |
|---|---|---|
| WO | 2018/097817 A1 | 5/2018 |
| WO | 2019/086309 A1 | 5/2019 |
| WO | 2020/116579 A1 | 6/2020 |
| WO | 2020/146739 A1 | 7/2020 |
| WO | 2020/234902 A1 | 11/2020 |

OTHER PUBLICATIONS

International Search Report and Written Opinion received for corresponding Patent Cooperation Treaty Application No. PCT/EP2021/076031, dated Dec. 23, 2021, 12 pages. No copy provided, per MPEP 609. Copy submitted in parent U.S. Appl. No. 17/117,521.
Invitation to Pay Additional Fees received for corresponding Patent Cooperation Treaty Application No. PCT/EP2021/076219, dated Jan. 24, 2022, 10 pages. No copy provided, per MPEP 609. Copy submitted in parent U.S. Appl. No. 17/117,521.
Zhao et al., "mID: Tracking and Identifying People with Millimeter Wave Radar", 15th International Conference on Distributed Computing in Sensor Systems (DCOSS), May 29-31, 2019, pp. 33-40. No copy provided, per MPEP 609. Copy submitted in parent U.S. Appl. No. 17/117,521.
Sarieddeen et al., "Next Generation Terahertz Communications: A Rendezvous of Sensing, Imaging, and Localization", IEEE Communications Magazine, vol. 58, No. 5, May 2020, pp. 69-75. No copy provided, per MPEP 609. Copy submitted in parent U.S. Appl. No. 17/117,521.
"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921. No copy provided, per MPEP 609. Copy submitted in parent U.S. Appl. No. 17/117,521.
Barneto et al., "Full-Duplex OFDM Radar with LTE and 5G NR Waveforms: Challenges, Solutions, and Measurements", IEEE Transactions on Microwave Theory and Techniques, vol. 67, No. 10, Oct. 2019, pp. 4042-4054. No copy provided, per MPEP 609. Copy submitted in parent U.S. Appl. No. 17/117,521.
El-Absi et al., "High-Accuracy Indoor Localization Based on Chipless RFID systems at THz Band", IEEE Access, vol. 6, Sep. 24, 2018, pp. 54355-54368. No copy provided, per MPEP 609. Copy submitted in parent U.S. Appl. No. 17/117,521.
"3rd Generation Partnership Project; Technical Specification Group Radio Access Network; NG-RAN; NR Positioning Protocol A (NRPPa) (Release 16)", 3GPP TS 38.455, V16.1.0, Sep. 2020, pp. 1-147. No copy provided, per MPEP 609. Copy submitted in parent U.S. Appl. No. 17/117,521.
Premalatha et al., "Catching Target Mobile Node using Time-of-arrival Measurement in Wireless Sensor Networks", International Conference on Innovation Information in Computing Technologies, Feb. 19-20, 2015, 6 pages. No copy provided, per MPEP 609. Copy submitted in parent U.S. Appl. No. 17/117,521.
Liang et al., "Deep Learning and Compressive Sensing-Based CSI Feedback in FDD Massive MIMO Systems", IEEE Transactions on Vehicular Technology, vol. 69, No. 8, Aug. 2020, pp. 9217-9222. No copy provided, per MPEP 609. Copy submitted in parent U.S. Appl. No. 17/117,521.
Communication pursuant to Article 94(3) EPC issued in corresponding European Patent Application No. 21 783 431.6 dated Jan. 10, 2024.
Communication pursuant to Article 94(3) EPC dated Jun. 28, 2024 issued in corresponding European Patent Application No. 21 783 431.6.

* cited by examiner

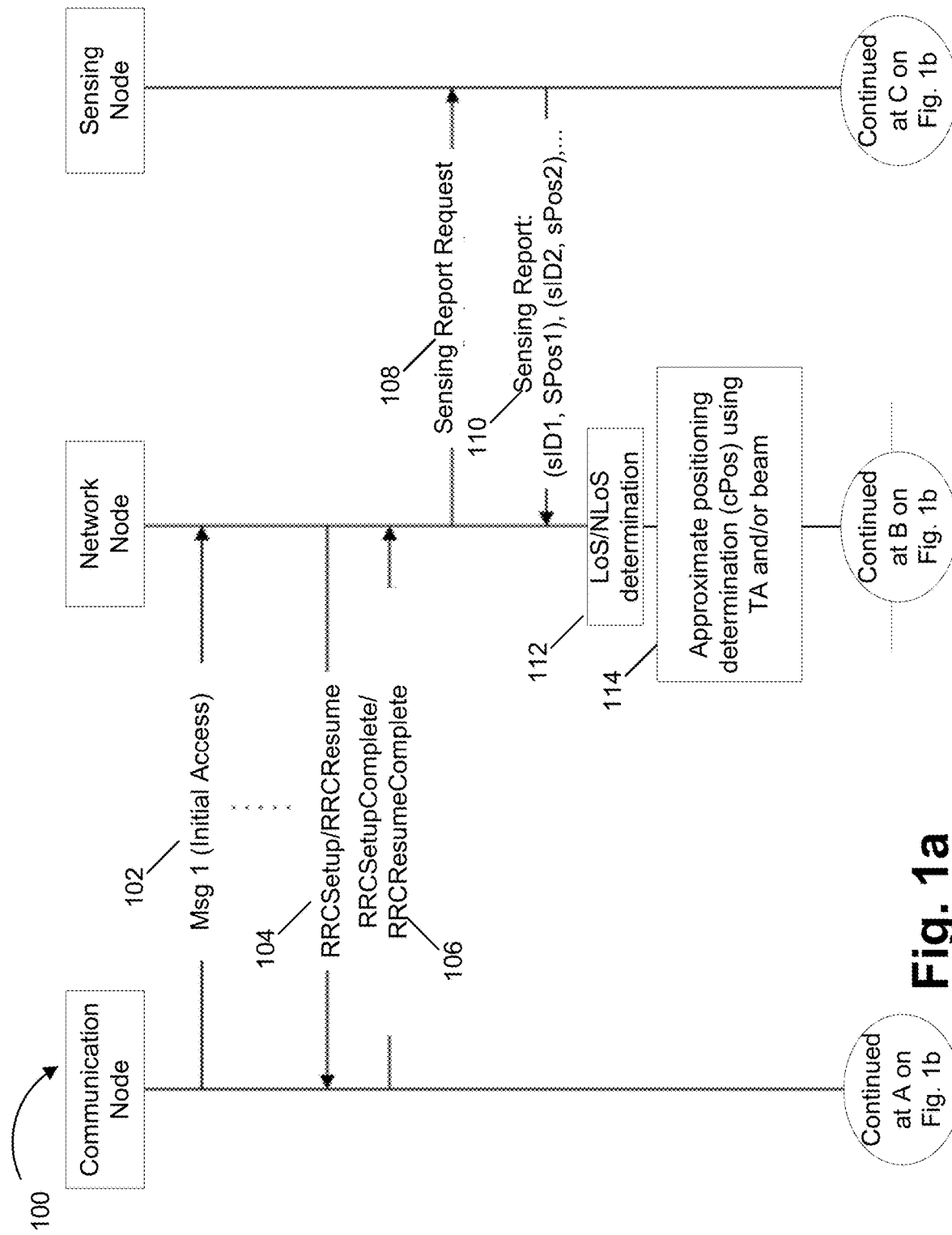

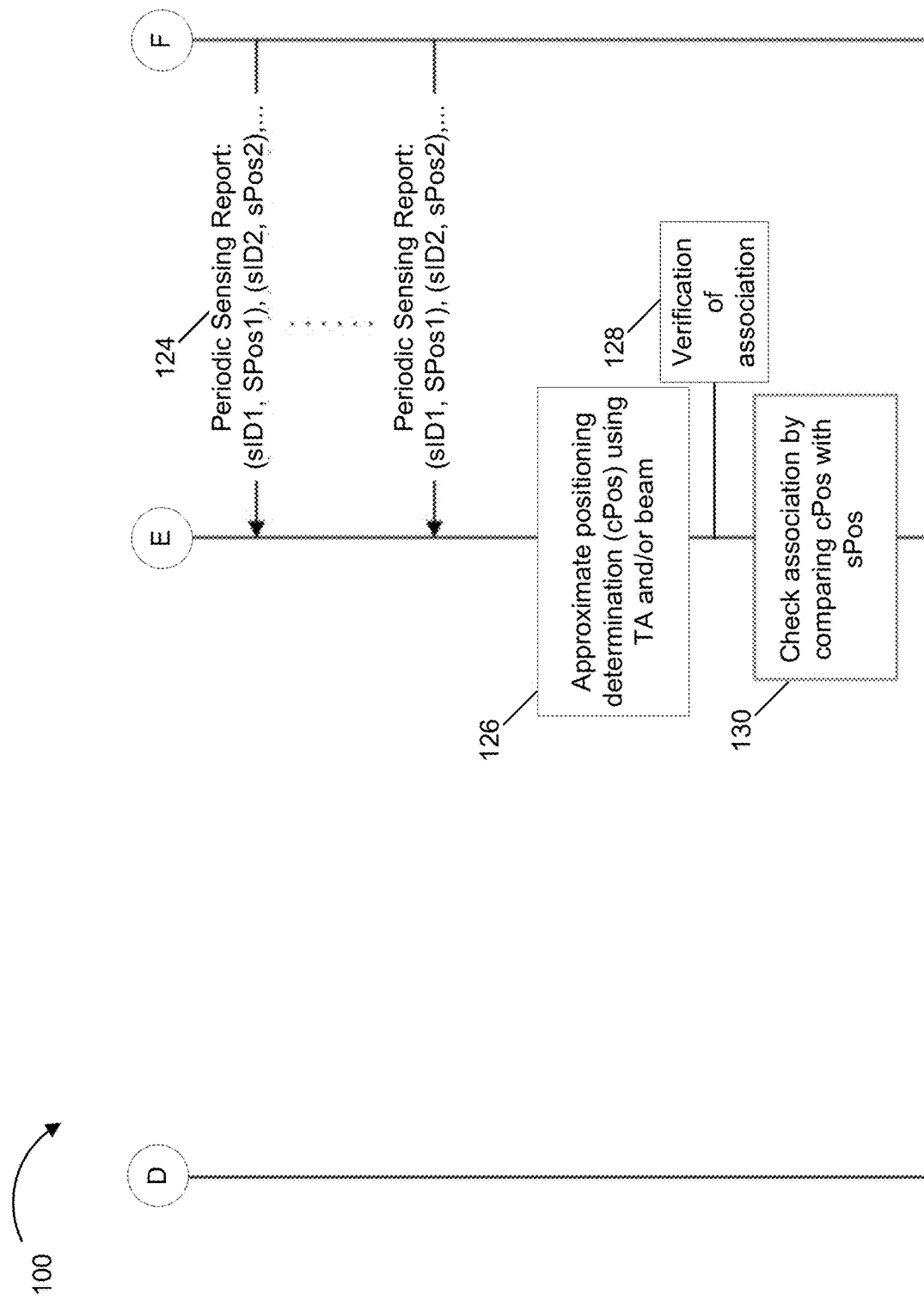

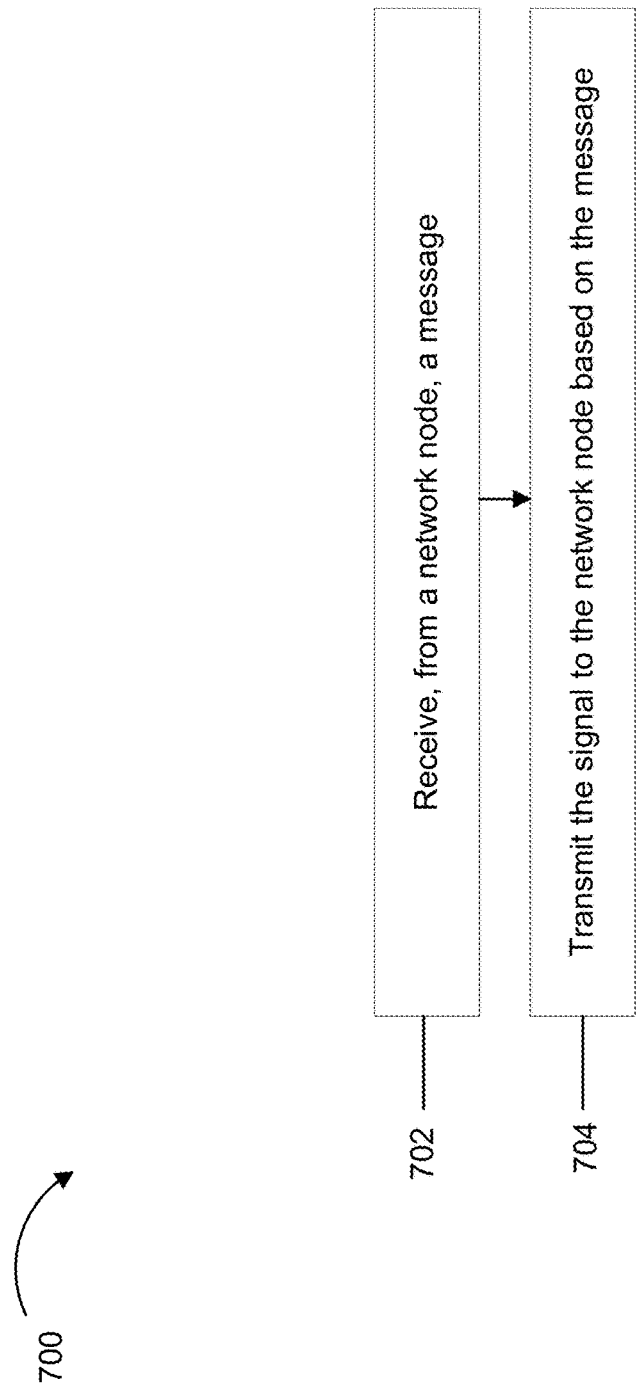

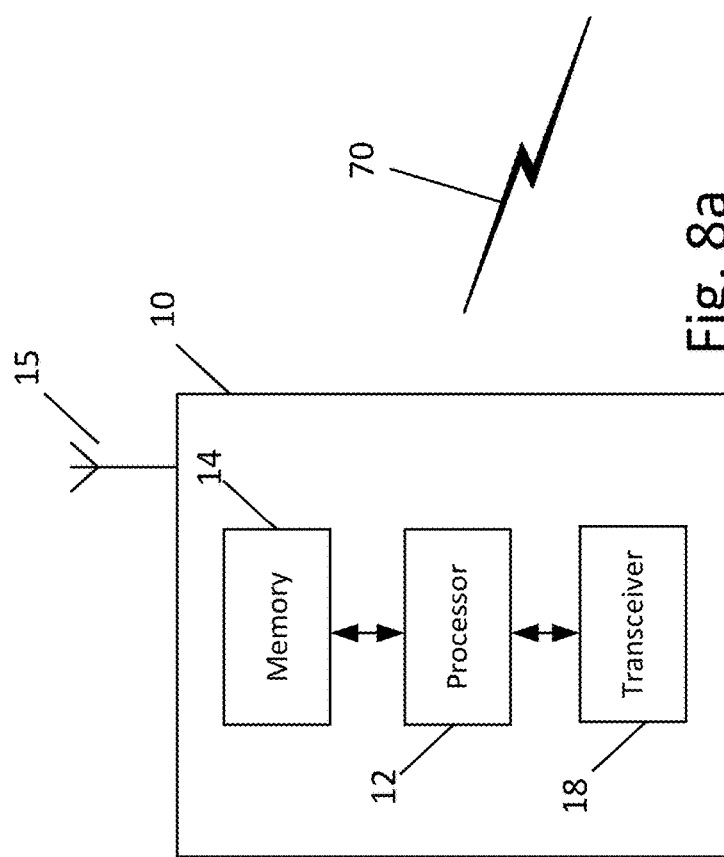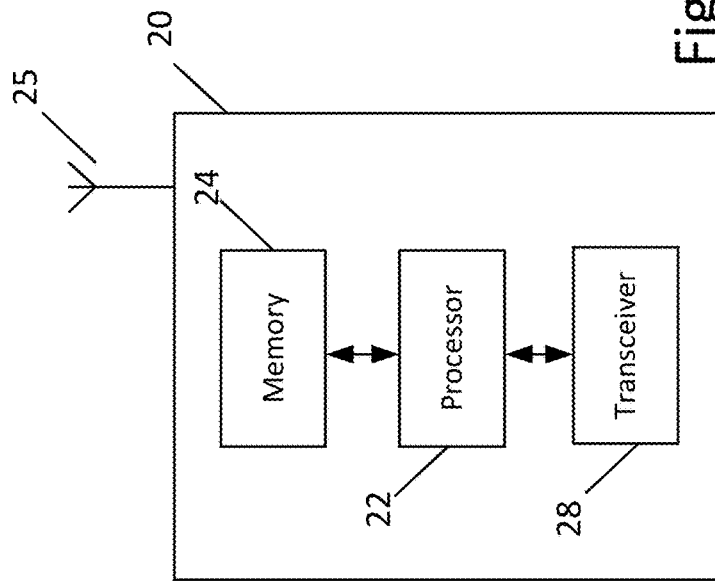

ASSOCIATING SENSING INFORMATION WITH A USER

CROSS-REFERENCE TO RELATED APPLICATIONS

This is a divisional application of U.S. patent application Ser. No. 17/117,521, filed on Dec. 10, 2020. The disclosure of the prior application is hereby incorporated by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for associating sensing information with a user.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include receiving, by a network node, sensing information from a sensing node. The method may include determining location information of a communication node. The method may include associating the sensing information from the sensing node with the communication node based on the location information relating to the communication node.

In a variant, the sensing information may include at least one of a sensing identifier of a sensed object, a positioning of the sensed object, a confidence of the positioning, a velocity of the sensed object, or a measure of a proximity of the sensed object to one or more other objects. In a variant, the location information may include an identifier or a positioning of the communication node. In a variant, the determining of the location information may further include determining the location information based on a timing advance or beam information associated with the communication node. In a variant, the determining of the location information may further include determining the location information based on an uplink communication from the communication node.

In a variant, the determining of the location information may further include determining the location information based on a radio condition and mobility information of the communication node. In a variant, the method may further include receiving additional sensing information from the sensing node, and updating the location information based on the additional sensing information. In a variant, the method may further include verifying the association based on mobility information from radio condition reporting of the communication node. In a variant, the method may further include re-performing the determining and the associating based on a failure to verify the associating. In a variant, updating the location information may include updating location information at the network nodes.

According to a second embodiment, a method may include transmitting, by a first network node to a second network node, an indication of one or more sensing capabilities of the first network node. The method may include receiving, from the second network node, an indication to report location information of a user equipment. The method may include transmitting, to the user equipment, a message. The message may be associated with causing the user equipment to transmit a signal. The method may include receiving the signal from the user equipment. The method may include identifying the user equipment as a sensed object based on the signal. The method may include transmitting location information to the second network node. The location information may identify a location of the user equipment.

In a variant, the method may further include determining a location of various objects or users in a cell based on performing sensing prior to transmitting the message. In a variant, the one or more sensing capabilities may include at least one of a type of sensing signals supported by the first network node, a resolution of the one or more sensing capabilities, a frequency of sensing updates, a number of objects or users that the first network node can track, a velocity estimation capability, or an accuracy of the velocity estimation capability. In a variant, the message may include a paging message based on the user equipment being in an idle mode or an inactive mode.

In a variant, the message may further include a configuration for the signal or an indication of when to measure the signal from a user equipment. In a variant, the message may include a positioning protocol message based on the user equipment being in a connected mode. In a variant, the message may include downlink control information (DCI) or a medium access control control element (MAC CE). In a variant, the signal may be specific to the user equipment, or the signal may be specific to a cell with which the user equipment is associated and may be associated with operations that are specific to the user equipment. In a variant, the identifying of the user equipment may further include identifying the user equipment based on a direction or a velocity of the signal.

In a variant, the identifying of the user equipment may further include, based on failing to identify the user equipment, requesting that the user equipment report a round trip time associated with the signal or transmit the signal multiple times. In a variant, the transmitting of the location information may further include transmitting the location information with confidence level information that comprises a confidence level associated with the identification of the user equipment. In a variant, the signal may include a radar signal, a radar pulse, or a radar sequence. In a variant, the identifying may further include identifying the user equipment as the sensed object based on associating an identifier of the user equipment with a sensing identifier of the sensed object.

According to a third embodiment, a method may include receiving, by a user equipment from a network node, a message. The message may be associated with causing the user equipment (UE) to transmit a signal. The signal may be associated with identifying the UE as a sensed object. The method may include transmitting the signal to the network node based on the message.

In a variant, the message may include a positioning protocol message based on the user equipment being in a connected mode. In a variant, the message may include DCI or a MAC CE. In a variant, the signal may be specific to the user equipment, or the signal may be specific to a cell with which the user equipment is associated and may be associated with operations that are specific to the user equipment. In some embodiments, the signal may include a radar signal, a radar pulse, or a radar sequence.

A fourth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, or the third embodiment, or any of the variants discussed above.

A fifth embodiment may be directed to an apparatus that may include circuitry configured to cause the apparatus to perform the method according to the first embodiment, the second embodiment, or the third embodiment, or any of the variants discussed above.

A sixth embodiment may be directed to an apparatus that may include means for performing the method according to the first embodiment, the second embodiment, or the third embodiment, or any of the variants discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the first embodiment, the second embodiment, or the third embodiment, or any of the variants discussed above.

An eighth embodiment may be directed to a computer program product encoding instructions for causing an apparatus to perform at least the method according to the first embodiment, the second embodiment, or the third embodiment, or any of the variants discussed above.

BRIEF DESCRIPTION OF THE DRAWINGS

For proper understanding of example embodiments, reference should be made to the accompanying drawings, wherein:

FIGS. 1a, 1b, and 1c illustrate a signal diagram of an example related to associating sensing information with a user, according to some embodiments;

FIG. 7 illustrates an example flow diagram of a method, according to some embodiments;

FIG. 8a illustrates an example block diagram of an apparatus, according to an embodiment; and FIG. 8b illustrates an example block diagram of an apparatus, according to another embodiment.

DETAILED DESCRIPTION

Figure 1B:
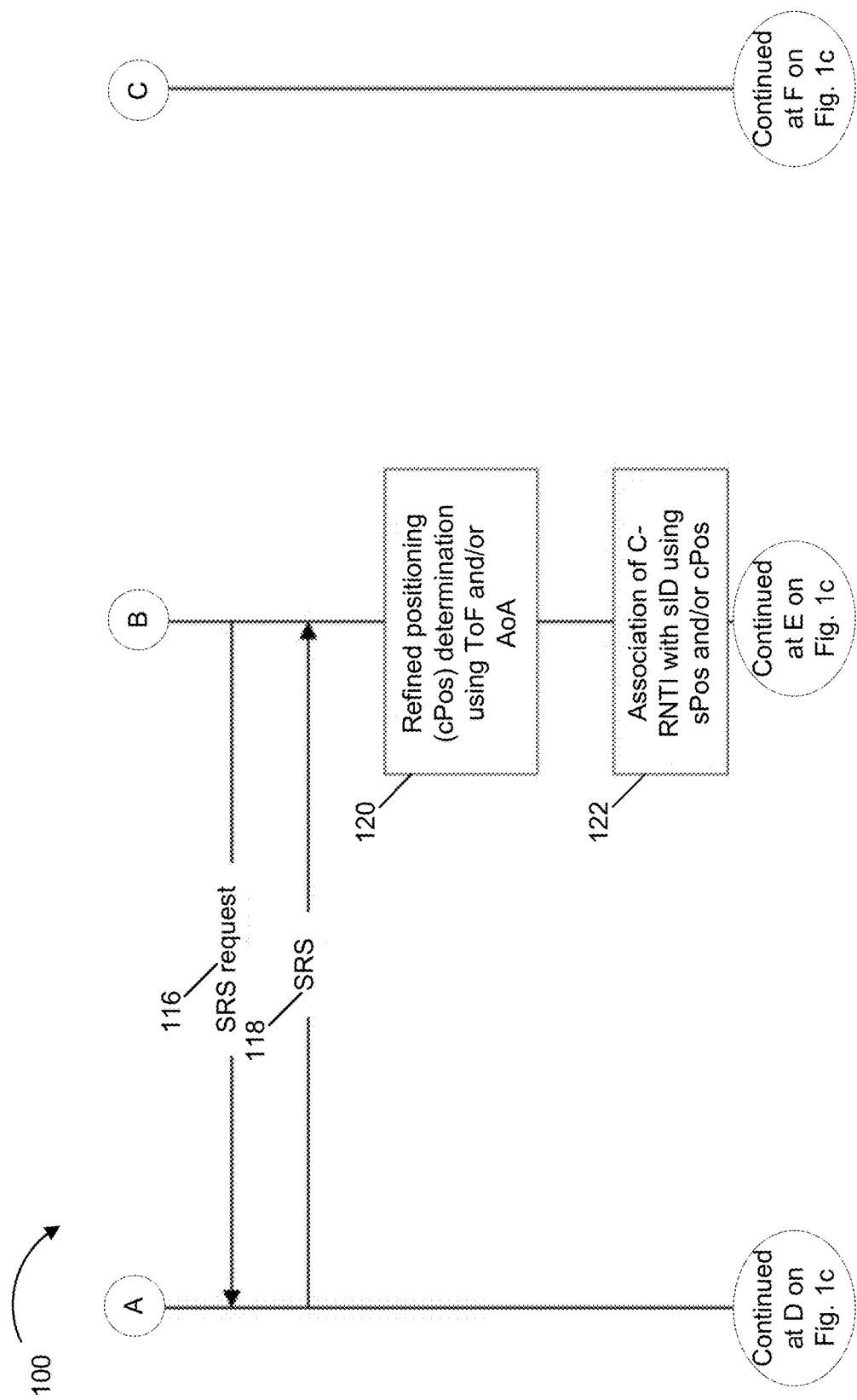

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for associating sensing information with a user is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

New spectrum technology (which may be intended for certain cellular technologies), may include the use of complementary sensing information to improve wireless communication in millimeter wave (mmWave) or terahertz (THz) spectrum. Sensing information (e.g., radar) in mmWave or THz spectrum can be used to map a deployment area and track user equipment (UE) or objects in the deployment area. The sensing may be passive and may not have to use or require any feedback or transmission from the sensed objects. In the communication domain, sensing can be used, e.g., to track a user equipment or other physical objects within a cell, such as for handover, for blockage detection and/or recovery, vehicle-to-vehicle (V2V) applications, etc. For example, a network may track a user and may initiate a handover without any feedback and/or measurement report from the UE. However, there may be problems related to associating an object identified from sensing to a UE that is performing wireless communication in the cell. For example, the network may have to know which one of the sensed objects is a particular UE in the cell. Thus, there may be a need to associate a UE and a sensed object.

Base stations can be equipped with radar and/or sensing equipment in a network (e.g., both at mmWave and THz spectrums). Object detection and classification may work using both radar and sensing and may provide a base station with the ability to identify where in the cell UEs are located. A base station may have sensing functionality, either built in or as part of a co-located sensing node. Further, a single radio-frequency integrated circuit (RFIC) can be designed to operate both as a communication node and sensing node using a single band or dedicated bands for sensing and communication. For communication purposes, it may be advantageous for the base station to track the UEs in the cell (e.g., for beam management or handover), as described above. However, it may also be important for positioning service (e.g., emergency call or asset tracking) to have knowledge of the UE locations. In cellular systems, the location server may be treated as a core network element (e.g., a location management function (LMF) in NR). The LMF may be implemented in a radio access network (RAN) as a local management component (LMC).

As explained above, there may be problems related to how the network can use sensing information in order to provide positioning services. One of the issues may include that, in the sensing case, the base station may not have a UE identifier, but rather just knows that a UE or object is at a given location. Cluster and classification algorithms may be able to identify that a given object is, e.g., a car or a bus, but this may not be sufficient for positioning services. Thus, there may be a need for providing location services for a network based on a UE-sensed object association.

Some embodiments described herein may provide for associating sensing information to a UE (e.g., a cellular user) by, for example, determining information from both a sensing node and a communication node (e.g., a UE), then associating the sensed object and the communication node based on the information. In certain embodiments, a network node (e.g., a gNB) may obtain sensing information from a sensing node. For example, the sensing information may include a sensing identifier, a positioning of an object (e.g., ranging information, such as distance and direction), a velocity of the sensed object, a confidence of the positioning, a measure of a proximity of the sensed object to one or more other objects, movement of the sensed object, and/or the like. The sensing node may be integrated with, or separate from, the network node. The sensing node may be equipped with radar capability for determining the position, range, angle, velocity, and/or other information relating to the object. In some embodiments, the network node may have one or more sensing capabilities and can operate as a sensing node.

The network node may determine location information from a communication node. For example, the location information may include an identifier of the communication node (e.g., a cell radio network temporary identifier (C-RNTI) or a temporary mobile subscriber identity (TMSI) or an international mobile equipment identity (IMEI) or media access control address (MAC address)), a positioning of the communication node, and/or the like. Various methods may be used to determine the location information. For example, as a first method, the network node may determine a communication node's location based on a timing advance and a beam information. Additionally, or alternatively, the network node may perform the determination based on a line-of-sight (LoS) or a non-line-of-sight (NLoS) determination. If further refinement of the location information should be performed, the network node may instruct the communication node to transmit an uplink signal, as in the second method described below. Other methods may be used to determine the location information such as observed time difference of arrival, uplink time difference of arrival, enhanced cell identifier, global navigation satellite system, multi-cell round-trip-time, uplink angle of arrival, downlink angle of departure, etc. For example, the network may request reference signal time difference (RSTD) measurements from the UE and may obtain the UE's location information using observed time difference of arrival.

As a second method, and as another example, the network node may instruct the communication node to transmit an uplink signal. The network node may then estimate positioning information (e.g., using angle-of-arrival (AoA) or time-of-flight (ToF)) from the uplink signal. As a third method, and as another example, the network node may use mobility information from the communication node to perform the association. For example, the network node may compare movement based on beam information (e.g., beam reports) from the communication node to tracking movement from a sensing node.

After determining the location information, the network node may associate a sensing identifier with an identifier of the communication node (e.g., may associate a sensing identifier with a C-RNTI) based on the location information. The network node may then obtain periodic updates from the sensing node for the object associated with the sensing identifier, and may use the updates to update location information of the identifier associated with the communication node. The network node may periodically verify the association based on a location determination from the communication node and the sensing node. For example, in the case of a wrong association, the network node may perform the determination and association steps again. In this way, certain embodiments described herein may allow a communication node to be tracked via sensing (e.g., without any input from the communication node) via association of a sensing node and a communication node. This can be used in many features, e.g., handover, link monitoring, mobility, link failure prediction and/or recovery, measurement relaxation, and/or the like, which may improve communications networks and/or the operations of their nodes.

Additionally, or alternatively, some embodiments described herein may provide for radar and sensing-based positioning. In association with performing sensing and/or tracking of the location of various objects and users in a cell with the RFIC in sensing mode, the network node may generate a radar heat map of the objects being sensed and/or tracked (e.g. a graphical map of data where colors are used to depict values). The network node may signal another network node (e.g., an LMF) with its sensing capabilities. The sensing capabilities may include a type of sensing signals supported (e.g., a radar pulse, a radar sequence, a radar signal, an orthogonal frequency division multiplexing (OFDM) signal, etc.) and the associated frequency band, a resolution of the sensing capability (e.g., an accuracy of the capability), and/or the like.

The other network node may send a positioning request to a communication node depending on a radio resource configuration (RRC) state of the communication node. The communication node may transmit a pre-defined radar signal (e.g., a radar pulse, a radar sequence, and/or the like) or another uplink signal (e.g., a sounding-reference signal, a demodulation reference signal, a positioning reference signal, a random access preamble, and/or the like), which can be individually configured by the network node or the other network node. This radar signal may be common across the cell and/or may be provided in system information. Additionally, or alternatively, the radar signal may be combined with communication node-specific operation (e.g., exclusive-OR (XOR) or scrambling), which may allow the network node to know both which communication node is sending the signal and what identifier is associated with that communication node.

The network node may receive a radar signal from a given direction and/or velocity, and can identify the communication node on its heat map as the sensed object that has transmitted. For ambiguity or contention resolution (e.g., two communication nodes in a similar direction and/or velocity), the network node may request the communication node to report a round-trip-time (RTT), which the communication node may measure during transmitting its radar signal. In certain embodiments, the RTT may be estimated by combining a UE receive (RX)-transmit (TX) time difference measurement and a network node RX-TX time difference measurement. The network node may also be able to determine a timing offset, and thus range, from the transmitted signal. This can further be used for contention resolution purposes.

The network node may send location information to the other network node associated with the communication node. In this way, certain embodiments may help the network node understand which object is the communication node requested for positioning services, which may improve a communications network and/or operation of their nodes.

FIGS. 1a, 1b, and 1c illustrate a signal diagram of an example 100 related to associating sensing information with a user, according to some embodiments. Specifically, FIGS. 1a, 1b, and 1c illustrate a single signal diagram that is split across those figures. As illustrated, the example 100 includes a communication node, a network node, and a sensing node. Prior to the operations illustrated in FIGS. 1a-1c, the network node may obtain sensing information from a sensing node (e.g., a sensing identifier and/or positioning information of a sensed object). Positioning information can include ranging information (e.g., distance and direction) from the network node. Additionally, or alternatively, sensing information, such as a velocity of the sensed object, a confidence in the positioning information, and a measure of proximity of the sensed object to one or more other objects, may also be obtained from the sensing node. For example, the sensing node may determine that a communication node is nearby one or more other objects and, therefore, may inform the network node so that it can select a method for determining location information (described below) that is appropriate. The sensing node may be at least partially integrated into the network node or may be separate from the network node.

The network node may determine approximate location information from the communication unit (e.g., an identifier, such as a C-RNTI or TMSI or IMEI, positioning information, and/or the like). The network node may use a first method where an approximate location estimate from the communication node is used. The network node may determine ranging information of objects from the sensing node. The network node may determine LoS or NLoS conditions at the communication node. The LoS or NLoS conditions may be determined from a channel response using, e.g., a received power and channel delay profile. Additional LoS or NLoS techniques, e.g., based on machine learning classification algorithms, may also be used. The network node may determine the communication node's approximate location via a timing advance (TA) and beam information. The TA values can provide the approximate range of the communication node from the network node. Alternative propagation delay estimates may be used in place of timing advance, if available (e.g., in-time synchronization and/or time sensitive networking (TSN) deployments). Beam information (e.g., information relating to a preferred beam in terms of beam strength or receive power) may provide angle estimation.

If further refinement is needed, the network node may instruct the communication node to transmit an uplink signal, as described in more detail below. The network node may associate the communication node with a sensed object based on ranging information from the sensing node and the communication node.

The network node may use a second method that uses uplink signals. The network node may determine ranging information of objects from the sensing node. The network node may instruct a communication node to transmit an uplink signal. The uplink signal can be a communication-specific signal, such as a sounding reference signal (SRS) or a sensing-specific signal. The network node may estimate positioning information (e.g., using AoA, ToF, and/or the like) from the uplink signal. The AoA may be estimated based on beam information. The ToF estimation may be estimated based on a specified timing relation between the uplink signal request and reception at the network node. For example, the network node may send a positioning reference signal (PRS) or another downlink reference signal and the communication node may respond with an SRS for timing estimation. The network node may then associate the communication node with a sensed object based on ranging information from a sensing node and a communication node.

Operations 102 through 130 illustrate a signaling using the first method and the second method described above for determining approximate location information from the communication node. As illustrated at 102, the communication node may transmit, to the network node, an initial access message (Msg 1). As illustrated at 104, the network node may transmit, to the communication node, an RRC setup and/or RRC resume message. As illustrated at 106, the communication node may transmit, to the network node, an RRC setup complete and/or RRC resume complete message. As illustrated at 108, the network node may transmit, to the sensing node, a sensing report request. As illustrated at 110, the sensing node may transmit, to the network node, a sensing report. As illustrated at 112, the network node may perform a LoS and/or NLoS determination. As illustrated at 114, the network node may perform an approximate positioning determination for a communication node (cPos) using a TA and/or a beam.

Turning to FIG. 1b, the signal diagram of the example 100 is continued at A, B, and C from FIG. 1a. As illustrated at 116, the network node may transmit, to the communication node, an SRS request, and the communication node may send an SRS at 118. As illustrated at 120, the network node may perform a refined positioning determination using ToF and/or AoA for a communication node (cPos). As illustrated at 122, the network node may perform an association of a C-RNTI with a sensing identifier (sID) using positioning information from a sensing node (sPos) and/or positioning information from a communication node (cPos).

Turning to FIG. 1c, the signal diagram of the example 100 is continued at D, E, and F from FIG. 1b. As illustrated at 124, the sensing node may transmit, to the network node, a periodic sensing report that comprises sensing identifiers (sID1, sID2, etc.) and positioning information for sensed objects (sPos1, sPos2, etc.). As illustrated at 126, the network node may perform an approximate positioning determining for a communication node (cPos) using a TA and/or a beam. As illustrated at 128, the network node may perform verification of an association of a sensed object and a communication node. As illustrated at 130, the network node may check the association by comparing positioning information for a communication node (cPos) with positioning information from a sensing node (sPos).

The network node may use a third method that uses mobility information. The network node may construct a map of a preferred beam index with location information. The communication node may perform beam management and reporting of channel state information (CSI) including beam information (e.g., a preferred beam) to the network node. Based on this, the network node may have information about the communication node's movement through beam reporting information. The network node may compare movement based on the communication node's beam information to tracking movement from the sensing node. From the mobility information, the network node may associate the communication node with the correct sensing object that corresponds to the communication node. The network node may maintain the mapping of a sensing identifier for the sensed object to an identifier of the communication node (e.g., C-RNTI). In case there is no mobility by the communication node, the network node may associate the communication node with the cluster of sensed objects and may keep tracking until there is movement.

After determining approximate location information (e.g., using the first method, the second method, or the third method), the network node may obtain periodic updates from the sensing node for the sensing identifier and may use this to update location information of the communication identifier. The network node may configure the sensing node to update the network node with the location of the sensing identifier for the communication node based on one or more threshold values (e.g., may request a sensing node to update a location of the sensed object if the communication node moves a threshold number of meters from its current location). Additionally, or alternatively, the network node may periodically verify the association using a location determination from the communication node and the sensing node. In the case of wrong association, the network node may perform the determination and association steps again.

As described above, FIGS. 1a-1c are provided as examples. Other examples are possible, according to some embodiments.

Figure 2:
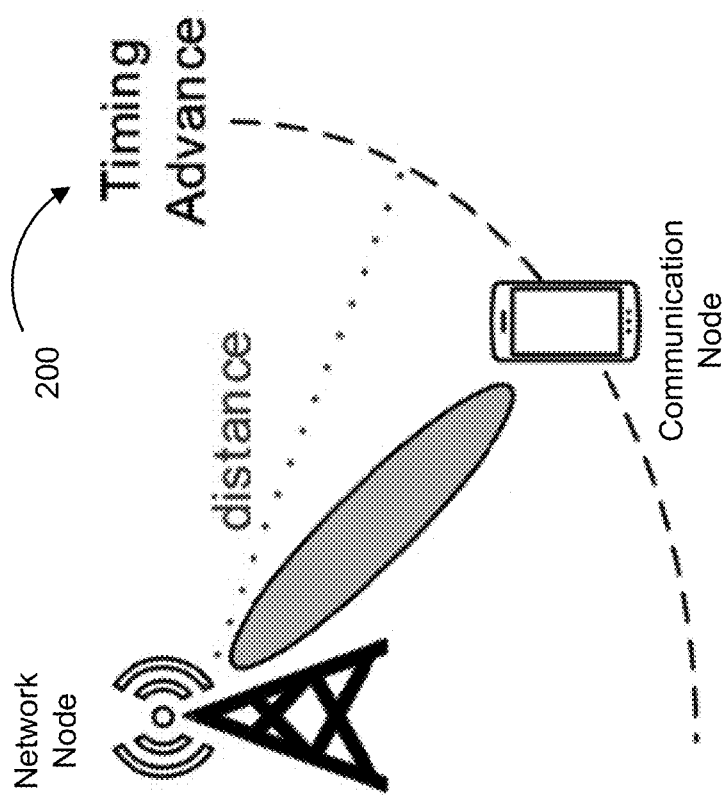
FIG. 2 illustrates an example of location estimation using timing advance (TA) and beam information, according to some embodiments.
Figure 3:
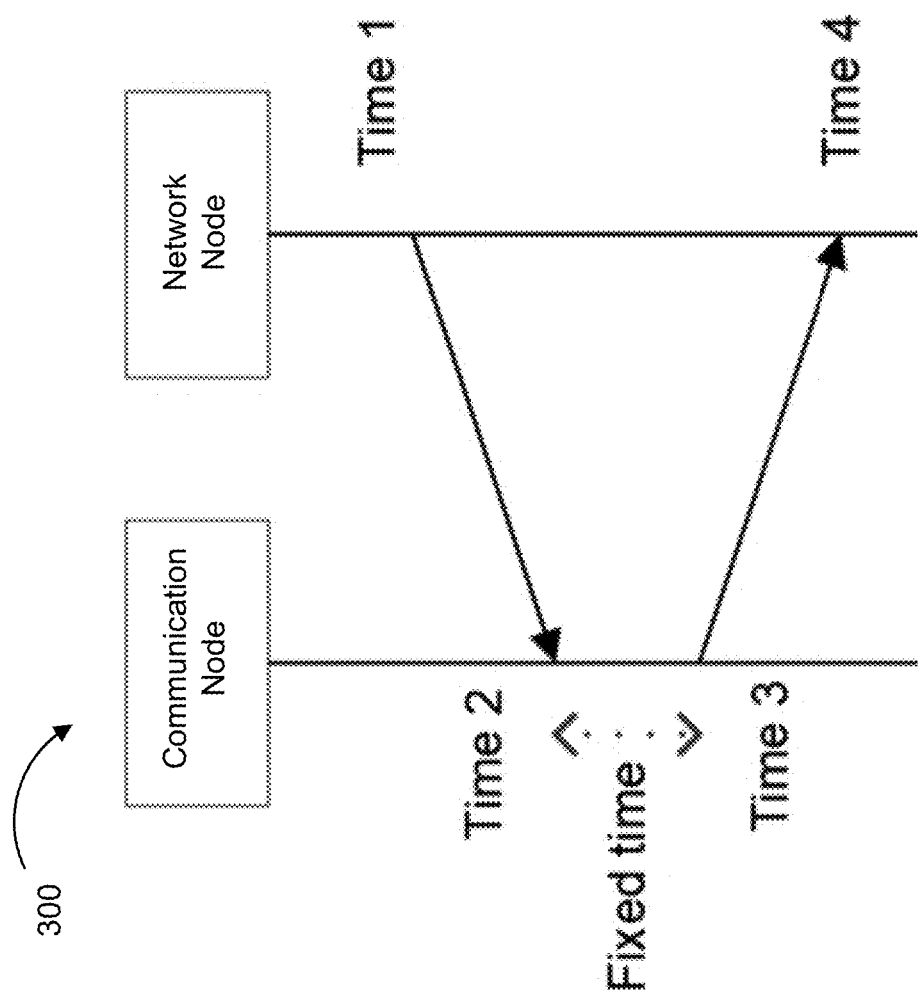
FIG. 3 illustrates an example of a round-trip-time (RTT) and/or time-of-flight (ToF) determination, according to some embodiments.

FIG. 2 illustrates an example of location estimation using TA and beam information, according to some embodiments. The TA is illustrated at 200 of FIG. 2. As indicated above, FIG. 2 is provided as an example. Other examples are possible, according to some embodiments. FIG. 3 illustrates an example of a RTT and/or ToF determination, according to some embodiments. The RTT and/or ToF determination is illustrated at 300 and, according to one embodiment, may equal (Time 4−Time 1)+(Time 2−Time 3). As described above, FIG. 3 is provided as an example. Other examples are possible, according to some embodiments.

Figure 4:
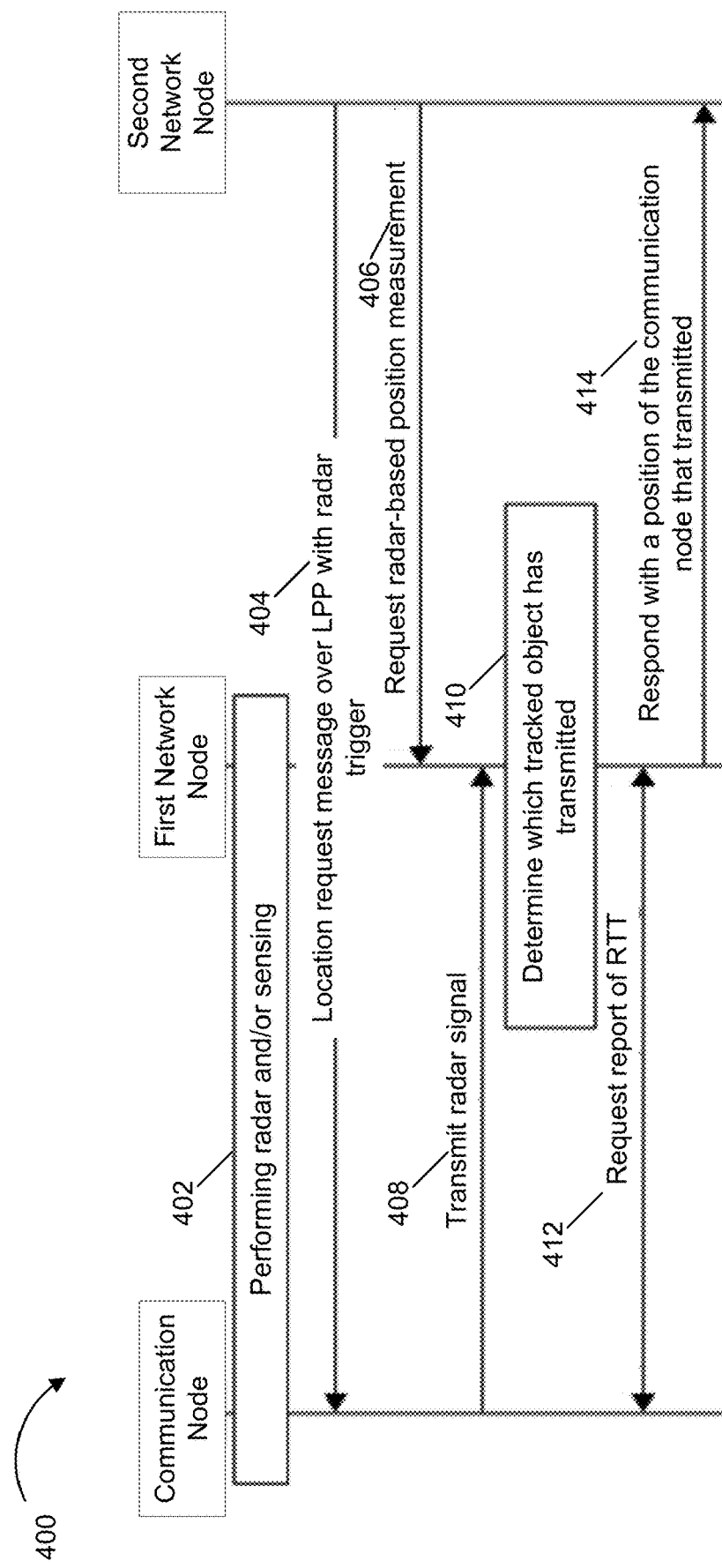
FIG. 4 illustrates a signal diagram of an example of radar and sensing-based positioning, according to some embodiments.

FIG. 4 illustrates a signal diagram of an example 400 of radar and sensing-based positioning, according to some embodiments. For example, FIG. 4 illustrates certain embodiments in the context of a location protocol, however, certain embodiments may apply to various protocols. The example 400 includes a communication node, a first network node (e.g., a gNB), and a second network node (e.g., an LMF). As illustrated at 402, the first network node may perform radar and/or sensing. For example, the network node may perform sensing and/or may track the location of various objects and communication nodes in a cell. The network node may generate a radar heat map based on the sensing and/or tracking. Communication nodes in the cell may have their location tracked, but the network node may not know the identifiers of the communication nodes that are being tracked. The network node may determine the location of a sensed object on the heat map that was identified using the sensing capability.

The first network node may signal the second network node with its sensing capabilities. The sensing capabilities may include a type of sensing signals supported (e.g., a radar signal, a reference signal, a OFDM-based signal, a preamble, a random access preamble, etc.), a resolution of the sensing capability (e.g., accuracy), a frequency of sensing updates, a maximum number of objects the first network node can track, a velocity estimation capability and accuracy, and/or the like. The first network node may check with the second network node to see if the first network node already has associated the communication node with a positioning. If so, the first network node may respond with the position of the communication node. If not, the second network node may initiate certain operations described below and may inform the first network node that it should be ready to measure for a sensing and/or ranging signal (e.g., in specific slot and/or symbols). This signalling may be implemented using NR positioning protocol A (NRPPa).

Certain embodiments described herein may help to identify the communication node on the heat map when positioning is requested. To facilitate this, the second network node may send a positioning request to the communication node. As illustrated at 404, the second network node may transmit, to the communication node, a location request message over LPP with a radar or uplink transmission trigger. As illustrated at 406, the second network node may send, to the first network node, a request for a radar-based or uplink signal transmission-based position measurement. The communication node may be in an RRC idle or inactive mode and may not have to have an active data channel with the first network node. In this case, a paging message may be used to communicate the positioning request to the communication node. Rather than responding to the paging with physical random access channel (PRACH), the communication node may respond with the radar signal or uplink signal. The paging message may comprise the configuration of the radar signal or uplink signal. If the communication node is in an RRC connected mode, the second network node may communicate with a positioning protocol, such as LPP or another positioning protocol between the communication node and the network node. This protocol may be transparent to the first network node, which may use physical downlink shared channel (PDSCH) to transmit or forward an LPP message. Alternatively, the first network node may be signalled by the second network node (e.g., using new radio positioning protocol A (NRPPa)) to send downlink control information (DCI) or a medium access control control element (MAC CE) to transmit the positioning request to the communication node.

As illustrated at 408, the communication node may transmit a radar signal. For example, the communication node may transmit a predefined radar signal that can be individually configured by the first network node or the second network node. The radar signal may be common across a cell. In this case, the first network node may perform operations to resolve the identifier of the communication node that performs the transmission, as described below. Alternatively, the radar signal may be combined with communication node-specific operation (e.g., XOR or scrambling with an identifier) to allow the first network node to determine both that the communication node has performed an identifiable option and what identifier is associated with that communication node. This may complicate the reception of the radar signal, but may simplify problems related to an identification of a communication node. In some embodiments, the UE-specific operation may be configured by the second network node and may be common across various network nodes (e.g., gNBs). In other embodiments, the communication node-specific operation may be configured per serving network node and may be just unique within that cell. The UE may implicitly determine the communication node-specific operation to employ.

As illustrated at 410, the first network node may determine which tracked object has transmitted. For example, the first network node may receive a radar signal (e.g., a radar pulse and/or sequence) from a given direction and/or velocity and may identify the communication node on its heat map as the sensed object that has transmitted. For ambiguity or contention resolution (e.g., two communication nodes in a similar direction and/or velocity), the first network node can request the communication node to report the RTT which it measures during transmitting its radar signal, as illustrated at 412. In certain embodiments, the first network node may configure the communication node to transmit multiple times to help resolve the ambiguity. In this way, the first network node may refine the radar and/or sensing measurements. The first network node may also be able to determine timing offset and/or range from the transmitted signal. This can further be used for contention resolution purposes, in certain embodiments.

As illustrated at 414, the first network node may respond with a position of the communication node that transmitted the radar signal. For example, the first network node may send location information and/or positioning information to the second network node of the identified second network node. The first network node may also include some confidence level in the location information and/or the positioning information based on the sensing information (e.g., the confidence level may be greater when no other objects are located nearby the communication node).

As described above, FIG. 4 is provided as an example. Other examples are possible, according to some embodiments.

Figure 5:
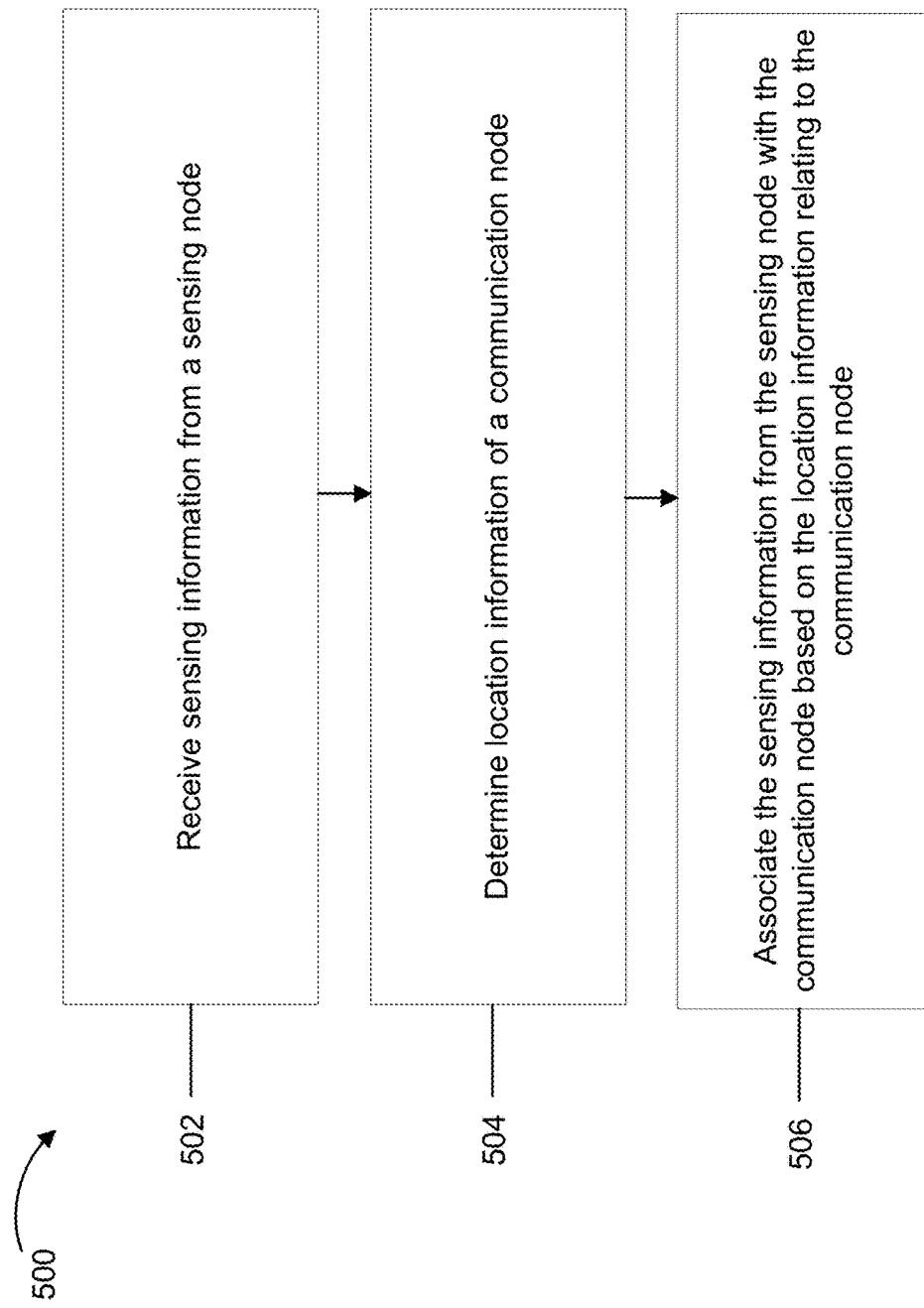
FIG. 5 illustrates an example flow diagram of a method, according to some embodiments.

FIG. 5 illustrates an example flow diagram of a method 500, according to some embodiments. For example, FIG. 5 may illustrate example operations of a network node (e.g., apparatus 10 illustrated in, and described with respect to, FIG. 8a). Some of the operations illustrated in FIG. 5 may be similar to some operations shown in, and described with respect to, FIGS. 1a-4.

In an embodiment, the method may include, at 502, receiving sensing information from a sensing node. The method may include, at 504, determining location information of a communication node. The method may include, at 506, associating the sensing information from the sensing node with the communication node based on the location information relating to the communication node.

The method illustrated in FIG. 5 may include one or more additional aspects described below or elsewhere herein. In some embodiments, the sensing information may include at least one of a sensing identifier of a sensed object, a positioning of the sensed object (e.g., a range, an angle, and/or a velocity of the sensed object from the sensing node), a confidence of the positioning, a velocity of the sensed object, or a measure of a proximity of the sensed object to one or more other objects. In some embodiments, the location information may include an identifier or a positioning of the communication node. In some embodiments, the determining 504 of the location information may further include determining the location information based on a timing advance or beam information associated with the communication node. In some embodiments, the determining 504 of the location information may further include determining the location information based on an uplink communication (e.g., uplink transmission) from the communication node.

In some embodiments, the determining 504 of the location information may further include determining the location information based on a radio condition (e.g., a beam map, a beam report, a channel state information report, etc.) and mobility information of the communication node. In some embodiments, the method may further include receiving additional sensing information from the sensing node, and updating the location information based on the additional sensing information. In some embodiments, the method may further include verifying the association based on mobility information from radio condition reporting (e.g., beam reporting) of the communication node. In some embodiments, the method may further include re-performing the determining and the associating based on a failure to verify the associating. In some embodiments, updating the location information may include updating location information at the network nodes (e.g., gNB and LMF).

As described above, FIG. 5 is provided as an example. Other examples are possible according to some embodiments.

Figure 6:
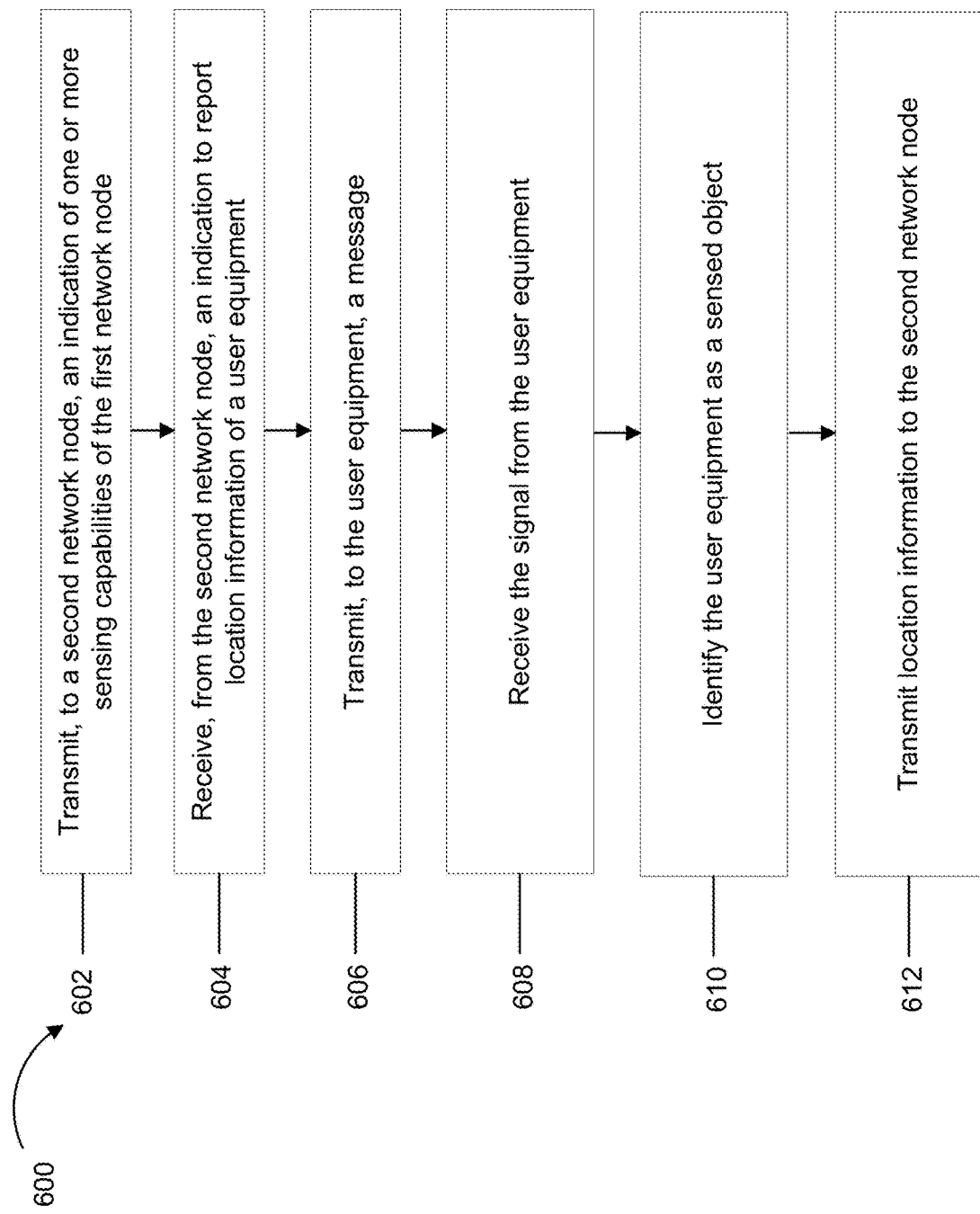
FIG. 6 illustrates an example flow diagram of a method, according to some embodiments.

FIG. 6 illustrates an example flow diagram of a method 600, according to some embodiments. For example, FIG. 6 may illustrate example operations of a first network node (e.g., apparatus 10 illustrated in, and described with respect to, FIG. 8a). Some of the operations illustrated in FIG. 6 may be similar to some operations shown in, and described with respect to, FIGS. 1a-4.

In an embodiment, the method may include, at 602, transmitting, to a second network node (e.g., a LMF), an indication of one or more sensing capabilities of the first network node. The method may include, at 604, receiving, from the second network node, an indication to report location information of a user equipment. The method may include, at 606, transmitting, to the user equipment, a message. The message may be associated with causing the user equipment to transmit a signal. The method may include, at 608, receiving the signal from the user equipment. The method may include, at 610, identifying the user equipment as a sensed object based on the signal. The method may include, at 612, transmitting location information to the second network node. The location information may identify a location of the user equipment.

The method illustrated in FIG. 6 may include one or more additional aspects described below or elsewhere herein. In some embodiments, the method may further include determining a location of various objects or users in a cell based on performing sensing prior to transmitting the message. In some embodiments, the one or more sensing capabilities may include at least one of a type of sensing signals supported by the first network node, a resolution of the one or more sensing capabilities, a frequency of sensing updates, a number of objects or users that the first network node can track, a velocity estimation capability, or an accuracy of the velocity estimation capability. In some embodiments, the message may include a paging message based on the user equipment being in an idle mode or an inactive mode.

In some embodiments, the message may further include a configuration for the signal or an indication of when to measure the signal from a user equipment. In some embodiments, the message may include a positioning protocol message based on the user equipment being in a connected mode. In some embodiments, the message may include DCI or a MAC CE. In some embodiments, the signal may be specific to the user equipment, or the signal may be specific to a cell with which the user equipment is associated and may be associated with operations that are specific to the user equipment. In some embodiments, the identifying 610 of the user equipment may further include identifying the user equipment based on a direction or a velocity of the signal.

In some embodiments, the identifying 610 of the user equipment may further include, based on failing to identify the user equipment (e.g., in the case of ambiguous identification where multiple UEs are identified as the same sensed object), requesting that the user equipment report a round trip time associated with the signal or transmit the signal multiple times. In some embodiments, the transmitting 612 of the location information may further include transmitting the location information with confidence level information that comprises a confidence level associated with the identification of the user equipment. In some embodiments, the signal may include a radar signal, a radar pulse, or a radar sequence. In some embodiments, the identifying at 610 may further include identifying the user equipment as the sensed object based on associating an identifier of the user equipment with a sensing identifier of the sensed object.

As described above, FIG. 6 is provided as an example. Other examples are possible according to some embodiments.

FIG. 7 illustrates an example flow diagram of a method 700, according to some embodiments. For example, FIG. 7 may illustrate example operations of a UE (e.g., apparatus 20 illustrated in, and described with respect to, FIG. 8*b*). Some of the operations illustrated in FIG. 7 may be similar to some operations shown in, and described with respect to, FIGS. 1*a*-4.

In an embodiment, the method may include, at 702, receiving, from a network node (e.g., a base station (BS)), a message. The message may be associated with causing the UE to transmit a signal. The signal may be associated with identifying the UE as a sensed object. The method may include, at 704, transmitting the signal to the network node based on the message.

The method illustrated in FIG. 7 may include one or more additional aspects described below or elsewhere herein. In some embodiments, the message may include a positioning protocol message based on the user equipment being in a connected mode. In some embodiments, the message may include DCI or a MAC CE. In some embodiments, the signal may be specific to the user equipment, or the signal may be specific to a cell with which the user equipment is associated and may be associated with operations that are specific to the user equipment. In some embodiments, the signal may include a radar signal, a radar pulse, or a radar sequence.

As described above, FIG. 7 is provided as an example. Other examples are possible according to some embodiments.

FIG. 8*a* illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8*a*.

As illustrated in the example of FIG. 8*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1*a*-6. For instance, apparatus 10 may be controlled by memory 14 and processor 12 to perform the methods of FIGS. 5 and 6.

FIG. 8*b* illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8*b*.

As illustrated in the example of FIG. 8*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1*a*-4 and 7. For instance, apparatus 20 may be controlled by memory 24 and processor 22 to perform the method of FIG. 7.

In some embodiments, an apparatus (e.g., apparatus 10 and/or apparatus 20) may include means for performing a method or any of the variants discussed herein, e.g., a method described with reference to FIGS. 5, 6, and 7. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is low reference signal overhead (e.g., due to a reduced or eliminated need for PRS transmissions by a network node). Other benefits of some example embodiments includes leveraging of sensing and/or radar capabilities of network nodes, single network node positioning, and/or enabling idle and/or inactive positioning. Accordingly, the use of some example embodiments results in improved functioning of communications networks and their nodes and, therefore constitute an improvement at least to the technological field of sensing in a cell, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

AoA Angle of Arrival
AoD Angle of Departure
C-RNTI Cell Radio Network Temporary Identifier
DL Downlink
gNB 5G Base Station
LMF Location Management Function
LOS Line of Sight
LPP LTE Positioning Protocol
NLoS Non-Line of Sight
NR New Radio (5G)
PRS Positioning Reference Signal
RS Reference Signal
RSRP Reference Signal Received Power
RTT Round Trip Time
SRS Sounding Reference Signal
SRS-P SRS for positioning
TA Timing Advance
TMSI Temporary Mobile Subscriber Identity
ToA Time of Arrival
ToF Time of Flight
UE User Equipment
UL Uplink

We claim:

1. An apparatus, comprising:
at least one processor; and
at least one memory including computer program code,
wherein the at least one memory and the computer program code are configured to, with the at least one processor, cause the apparatus at least to:
receive, from a network node, a message, wherein the message is associated with causing the apparatus to transmit a signal, wherein the signal is associated with identifying the apparatus as a sensed object; and
transmit the signal to the network node based on the message, wherein the signal comprises a sensing identifier, positioning information of the apparatus, and an indication that a communication node is within a proximity of the apparatus.

2. The apparatus according to claim 1, wherein the message includes a sensing report request.

3. The apparatus according to claim 1, wherein the signal comprises a sensing report.

4. The apparatus according to claim 3, wherein the signal comprises periodic sensing reports.

5. The apparatus according to claim 1, wherein the signal further comprises at least one of a confidence of the positioning information, a velocity of the apparatus, or a measure of a proximity of the apparatus to one or more other objects.

6. The apparatus according to claim 1, wherein the positioning information includes ranging information.

7. The apparatus according to claim 6, wherein the ranging information includes at least one of a distance or a direction of the apparatus relative to the network node.

8. The apparatus according to claim 1, wherein the signal is transmitted based on a threshold value.

9. The apparatus according to claim 8, wherein the threshold value corresponds to a distance between the apparatus and one or more other objects.

10. The apparatus according to claim 1, wherein the at least one memory and the computer program code are configured to, with the at least one processor, further cause the apparatus at least to determine one or more of the sensing identifier or the positioning information using radar capability.

* * * * *